US006064993A

United States Patent [19]

Ryan, Jr.

[11] Patent Number: 6,064,993

[45] Date of Patent: May 16, 2000

[54] CLOSED SYSTEM VIRTUAL POSTAGE METER

[75] Inventor: Frederick W. Ryan, Jr., Oxford, Conn.

[73] Assignee: Pitney Bowes Inc., Stamford, Conn.

[21] Appl. No.: 08/993,358

[22] Filed: Dec. 18, 1997

[51] Int. Cl.[7] .................................................... G06F 17/00

[52] U.S. Cl. ................................ 705/403; 705/60; 705/62

[58] Field of Search .................................... 705/403, 401, 705/408, 410, 60, 62, 63; 235/375, 381; 364/479.01, 479.02, 479.05, 479.06; 380/51

[56] References Cited

U.S. PATENT DOCUMENTS

| | | | |
|---|---|---|---|
| 4,097,923 | 6/1978 | Eckert, Jr. et al. | 705/403 |
| 4,276,299 | 6/1981 | Della Bella et al. | 705/403 |
| 4,447,890 | 5/1984 | Duwel et al. | 705/403 |
| 4,725,718 | 2/1988 | Sansone et al. | 235/375 |
| 4,743,747 | 5/1988 | Fougere et al. | 235/375 |
| 4,757,537 | 7/1988 | Edelmann et al. | 380/51 |
| 4,760,532 | 7/1988 | Sansone et al. | 705/403 |
| 4,775,246 | 10/1988 | Edelmann et al. | 705/60 |
| 4,802,218 | 1/1989 | Wright et al. | 705/60 |
| 4,812,994 | 3/1989 | Taylor et al. | 705/410 |
| 4,813,912 | 3/1989 | Chickneas et al. | 705/408 |
| 4,831,555 | 5/1989 | Sansone et al. | 705/408 |
| 4,837,701 | 6/1989 | Sansone et al. | 705/404 |
| 4,853,865 | 8/1989 | Sansone et al. | 705/403 |
| 4,853,961 | 8/1989 | Pastor | 713/176 |
| 4,873,645 | 10/1989 | Hunter et al. | 364/479.01 |
| 5,142,577 | 8/1992 | Pastor | 705/62 |
| 5,377,268 | 12/1994 | Hunter | 705/63 |
| 5,448,641 | 9/1995 | Pintsov et al. | 380/51 |
| 5,454,038 | 9/1995 | Cordery et al. | 705/60 |
| 5,510,992 | 4/1996 | Kara | 705/408 |
| 5,606,507 | 2/1997 | Kara | 705/408 |
| 5,666,421 | 9/1997 | Pastor et al. | 380/51 |
| 5,682,318 | 10/1997 | Kara | 705/402 |
| 5,682,427 | 10/1997 | Seestrom | 380/51 |
| 5,717,597 | 2/1998 | Kara | 705/408 |
| 5,742,683 | 4/1998 | Lee et al. | 705/60 |
| 5,781,438 | 7/1998 | Lee et al. | 705/404 |
| 5,793,867 | 8/1998 | Cordery et al. | 705/60 |
| 5,802,175 | 9/1998 | Kara | 380/277 |
| 5,812,991 | 9/1998 | Kara | 705/410 |
| 5,819,240 | 10/1998 | Kara | 705/408 |
| 5,822,738 | 10/1998 | Shah et al. | 705/410 |
| 5,822,739 | 10/1998 | Kara et al. | 705/410 |

*Primary Examiner*—Edward R. Cosimano
*Assistant Examiner*—Thomas A. Dixon
*Attorney, Agent, or Firm*—Charles R. Malandra, Jr.; Michael E. Melton

[57] ABSTRACT

A system and method for evidencing postage on a mailpiece includes a printer module transmitting to a remote data center a request for indicia data. The data center includes a processor, a database and a secure coprocessor. The database includes user account data. The request includes postal value for a selected number of indicia to be printed by the printer module. The data center verifies that the printer module is authorized to request the postal value and retrieves user account data stored in a database. The data center verifies the user's account data includes sufficient funds for the number of indicia requested, debits the user's account data for the total postal value requested and then generates a digital token for each of the Indicia. The digital token is generated from information relating to each of the indicia including information unique to each of the indicia. The data center transmits to the printer module the requested indicia data including postal value and digital token for each of the indicia. The printer module prints the received indicia.

16 Claims, 3 Drawing Sheets

CLOSED SYSTEM VIRTUAL POSTAGE METER

RELATED APPLICATIONS

The present application is related to the following U.S. patent applications Ser. Nos. 08/993,355, 08/993,356, 08/993,357, and 08/993,311, all filed concurrently herewith and assigned to the assignee of the present invention.

FIELD OF THE INVENTION

The present invention relates generally to a postage metering system and method for printing postage indicia and, more particularly, to a postage metering system and method for printing postage indicia using digital printers.

BACKGROUND OF THE INVENTION

Postage metering systems have been developed which employ encrypted information printed on a mailpiece as evidence of postage that can be authenticated. Generally, the encrypted information includes postage value for the mailpiece and other information, which is printed in an indicium of a mailpiece. The encrypted information, which is commonly referred to as a digital signature or digital token, is used to authenticate the information imprinted on a mailpiece including postal value. As a result of the digital token incorporating such information printed in the indicium, altering the printed information in the indicium is detectable by standard verification procedures. Examples of systems for generating and using digital tokens are described in U.S. Pat. No. 4,757,537 for SYSTEM FOR DETECTING UNACCOUNTED FOR PRINTING IN A VALUE PRINTING SYSTEM; U.S. Pat. No. 4,831,555 for UNSECURED POSTAGE APPLYING SYSTEM; U.S. Pat. No. 4,775,246 for SYSTEM FOR DETECTING UNACCOUNTED FOR PRINTING IN A VALUE PRINTING SYSTEM; U.S. Pat. No. 4,873,645 for SECURE POSTAGE DISPENSING SYSTEM; and, U.S. Pat. No. 4,725,718 for POSTAGE AND MAILING INFORMATION APPLYING SYSTEM, all assigned to the assignee of the present invention.

Presently, postage metering systems are recognized as either closed or open system devices. In a closed system device, the system functionality is solely dedicated to metering activity. Examples of closed system metering devices include conventional digital and analog postage meters wherein a dedicated printer is securely coupled to a metering or accounting function. In a closed system device, since the printer is securely coupled and dedicated to the meter, printing cannot take place without accounting. In an open system device, the printer is not dedicated to the metering activity. This frees the system functionality for multiple and diverse uses in addition to the metering activity. Examples of open system metering devices include personal computer (PC) based devices with single/multi-tasking operating systems, multi-user applications and digital printers. An open system metering device includes a non-dedicated printer that is not securely coupled to a secure accounting module.

Since Conventional mechanical and electronic postage meters have heretofore secured the link between printing and accounting, the integrity of the physical meter box has been monitored by periodic inspections of the meters. Digital printing postage meters, which are closed system postage meters, typically include a digital printer coupled to a metering (accounting) device, which is referred to herein as a postal security device (PSD). Digital printing postage meters, while still enclosing the accounting and printing mechanisms within a physical meter box, have removed the need for physical inspection by cryptographically securing the link between the accounting and printing mechanisms. In essence, new digital printing postage meters create a secure point to point communication link between the accounting unit and printhead. See, for example, U.S. Pat. No. 4,802, 218, issued to Christopher B. Wright et al and now assigned to the assignee of the present invention. Examples of a conventional digital metering system are Post Perfect™ and Personal Post Office™ meters manufactured by Pitney Bowes Inc. of Stamford, Conn.

One version of an open metering system, referred to herein as a "Virtual Meter", includes a Host PC without a PSD coupled thereto. The Host PC runs client metering applications, but all PSD functions are performed at a Data Center. The PSD functions at the Data Center may be performed in a secure device attached to a computer at the Data Center, or may be performed in the computer itself. The Host PC must connect with the Data Center to process transactions such as postage dispensing, meter registration, or meter refills. Transactions are requested by the Host PC and sent to the Data Center for remote processing. The transactions are processed centrally at the Data Center and the results are returned to the Host PC. Accounting for funds and transaction processing are centralized at the Data Center. See, for example, U.S. Pat. No. 5,454,038, which is assigned to the assignee of the present invention. The security for an open system virtual meter is based on addressee information being included in the encrypted information, i.e. digital token, printed in the indicium. The verification of an open system indicium includes scanning the addressee information printed on the mailpiece and using scanned addressee information to recreate the digital token. Thus, for open systems it is necessary to include addressing in the encrypted information to discourage the printing of multiple copies of a valid indicium which would be easy to do on a PC-based system. Heretofore, closed systems have not been considered suitable for a virtual meter configuration since closed systems do not include addressee information.

SUMMARY OF THE INVENTION

It has been found that a closed system virtual metering system can be implemented wherein a digital printer, such as a mailing machine or label printer, can communicate with the Data Center to obtain evidence of postage payment. The security for such a closed virtual metering system is achieved by cryptographically coupling the printing of postage with accounting to ensure that multiple copies of an indicium are not printed. Security may alternately be achieved by the logging of each transaction, preferably at the Data Center. It has been found that the logging of each transaction and a verification process by the Post allows an unsecure printer to be used in the dosed virtual metering system.

The closed virtual metering system is configured with authorized indicium printers obtaining postage value from a PSD that is remotely located at the Data Center. In the preferred embodiment, modems or internet connections for accessing the Data Center are located in the digital printer or in an interface module connected thereto.

It has been found that there are several benefits to a closed system virtual meter in accordance with the present invention. Funds are not are stored at a user's site reducing the risk of unauthorized modification of accounting balances. There is a database record of every mail piece which means that verification will be improved since all valid pieces are known. Also, a low cost device can be used without the need to include destination address as in open systems meters. (This is made possible by the secure/dedicated printer link.) Furthermore, the present invention enables the Post to know the volume of mail to be processed prior to receipt of physical mail pieces. There will be more customer data available (e.g. when they usually mail, how much mail per day, average postage amount) which will enable the Post to predict mail handling patterns. Finally, users have the option to pay as they go which contrasts present systems in which funds must be on deposit prior to being downloaded to a meter even though such downloaded funds may remain in the meter for weeks before being used.

There are additional benefits that are realized from the present invention. One such benefit relates to the postal regulations requiring that the postage printed on a metered mailpiece must be obtained from a meter licensed from the local post office at which the mailpiece is deposited for mailing, commonly referred to as "origin of deposit" or "domain". In addition, all postal revenues obtained from meter use must be transferred to the licensing Post Office. With an indium printer accessing a PSD at the Data Center, a user having indicium printers located at a plurality of locations does not need a separate PSD for each location to conform to such postal regulations. Furthermore, a user of a dosed virtual metering system located in Shelton, Connecticut may be want to deposit its mailpieces in a Post Office at different origins of deposit, such as Stamford, Connecticut. The present invention provides each user of the dosed virtual metering system with access to a PSD having different origins of deposit.

Another benefit of the present invention is that mailpiece generation does not have to be interrupted because of PSD funds limitation.

The present invention provides a system and method for evidencing postage on a mailpiece which includes a printer module transmitting to a remote data center a request for indicia data. The data center includes a processor, a database and a secure coprocessor. The database includes user account data. The request includes postal value for a selected number of indicia to be printed by the printer module. The data center verifies that the printer module is authorized to request the postal value and retrieves user account data stored in a database. The data center verifies the user's account data includes sufficient funds for the number of indicia requested, debits the user's account data for the total postal value requested and then generates a digital token for each of the indicia. The digital token is generated from information relating to each of the indicia including information unique to each of the indicia. The data center transmits to the printer module the requested indicia data including postal value and digital token for each of the indicia. The printer module prints the received indicia.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
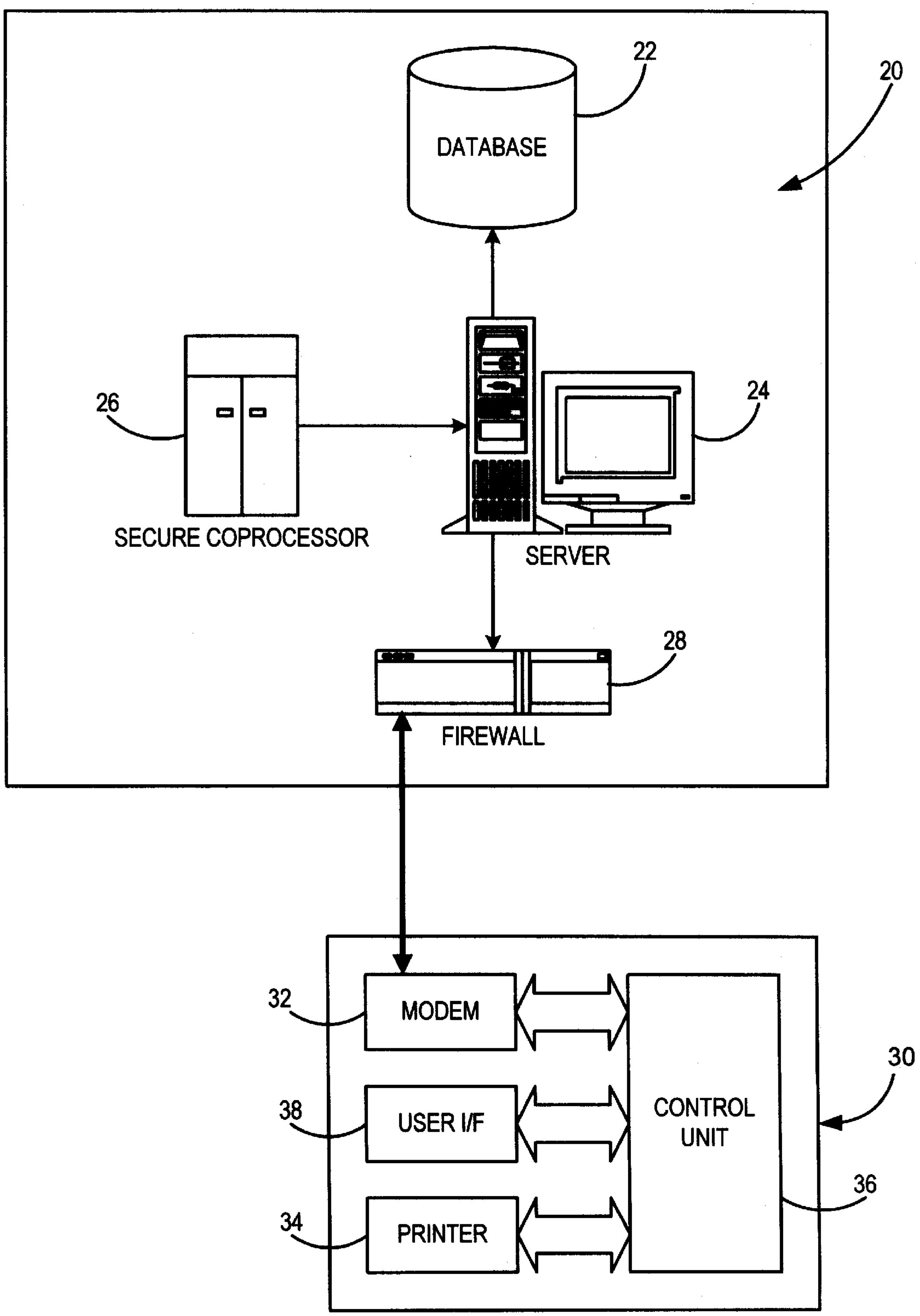
FIG. 1 is a block diagram of a closed virtual metering system with indicium printer in communication with a Data Center in accordance with the preferred embodiment of the present invention.

In describing the present invention, reference is made to the drawings, wherein there is seen in FIG. 1 a block diagram of a closed virtual metering system, generally designated 10, including a Data Center 20 and an indicia printer module 30. Data Center 20 includes a database 22, a server 24, a secure coprocessor 26 and a firewall 28. Database 22 is used to store customer account data, such as account balance and credit card number, and other customer information, such as a telephone number. Also stored in the database is information corresponding to printer 30, such as piece count, encrypted keys for token generation and authentication and a transaction log of transactions processed by the Data Center. Server 24 processes all transactions at the Data Center. Secure coprocessor 26 performs cryptographic operations at the Data Center, such as token generation. In an alternate embodiment, these cryptographic operations may be performed by the server 24. However, this is a less secure implementation. The firewall 28 is the a conventional first line of defense against unauthorized access to server Indicia printer module 30 includes a modem 32, which operates as a communication interface between indicia printer 30 and Data Center 20, a printer 34, a control unit 36 and a user interface 38. In the preferred embodiment Printer 34 is a label printer. In an alternate embodiment, printer 34 may print directly on envelopes or meter tape as other digital printing means. Control unit 36 which contains a microprocessor, memory means and non-volatile storage, controls all machine operations, including communication with the Data Center, user interface and printing functions. The user interface 38 includes a keypad and display for user input and status messages.

The printer may be unsecured or may be securely coupled as described in U.S. patent application Ser. No. 08/864,929, filed May 29, 1997, entitled SYNCHRONIZATION OF CRYPTOGRAPHIC KEYS BETWEEN TWO MODULES OF A DISTRIBUTED SYSTEM and assigned to the assignee of the present invention, or in U.S. Pat. No. 4,802,218, issued to Christopher B. Wright et al and now assigned to the assignee of the present invention.

It has been found that the printer may be a conventional mailing machine, such as Paragon™, manufactured by Pitney Bowes of Stamford, Connecticut, or may be a printer dedicated to printing some type of indicium, for example a label printer.

Figure 2:
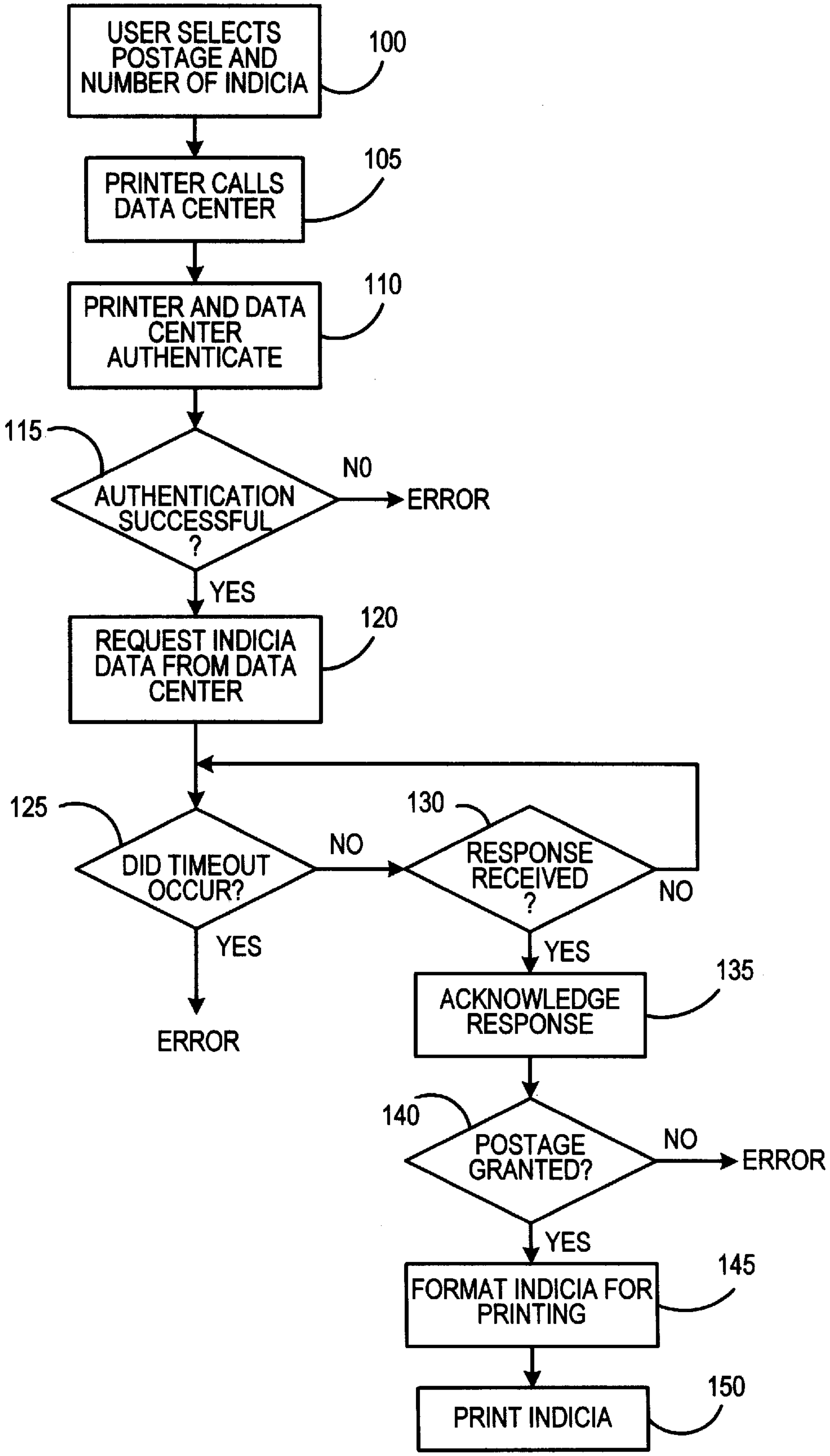
FIG. 2 is a flow chart of the printer operation in the dosed virtual metering system of FIG. 1.

Referring now to FIG. 2, printer module 30 operation is described. At step 100, a user selects a postage amount and a number of indicia to be printed. In accordance with the present invention, requests for multiple indicia, for example 5 indicia at $0.32 each, are sent at the same time to reduce the costs of establishing separate connections to the Data Center for each indicium. At step 105, the printer module 32 calls the Data Center. Although modem 30 is shown in FIG. 1, it will be understood that any conventional connection method, such as internet or R/F, is suitable. At step 110, the printer module 30 mutually authenticates with the Data Center, for example as set forth above. When the connection to the Data Center is established, the printer module 30 identifies itself by its serial number. This allows the Data Center to obtain user information and printer specific information, such as printer token keys. In the preferred embodiment, the printer module 30 has a unique key to authenticate itself to the data center. However, a single key or limited set of keys may be used for all printers. If the authentication is successful, at step 115, then, at step 120, the printer module 30 requests indicia data from Data Center. This request may include postal information, such as postal amount, weight and a unique piece identifier. If the authentication is not successful, then an error is reported. As noted previously, multiple requests for indicia may be sent at once. In the preferred embodiment, Indicia data, which is for a closed system indicia, includes piece count, postage amount, origin zip, printer identification, date, digital tokens and check digits. Using such indicia data in the generation of tokens for each indicium allows the Post to verify each indicium using only a limited set of data, the set of meters token keys. In an alternate embodiment, Indicia data may simply be an indicium serial number (digitally signed or not signed). This indicium serial number may be assigned by the Data Center or may be the unique piece identifier sent in the request by the printer module Since all the indicia that are being issued are known at the Data Center, this information can be sent to the Post. The Post can then use this data to verify all mail pieces that appear in the mail stream. This method requires that the Post maintain a database for every mail piece produced. However, this method could also be used for a post billing arrangement.

At step 120, if a timeout occurs before a response is received from the Data Center, an error is reported. When a response is received, at step 130, then the printer module 30 acknowledges the response, at step 135. If, at step 140, postage is not included in the response from the Data Center an error is reported. If postage is included, then, at step 145, the printer module 30 formats the indicia for printing. In the preferred embodiment, all indicia are formatted at once and then printed. However, they could be formatted and printed one at a time. At step 150, the printer module 30 prints the indicia.

Figure 3:
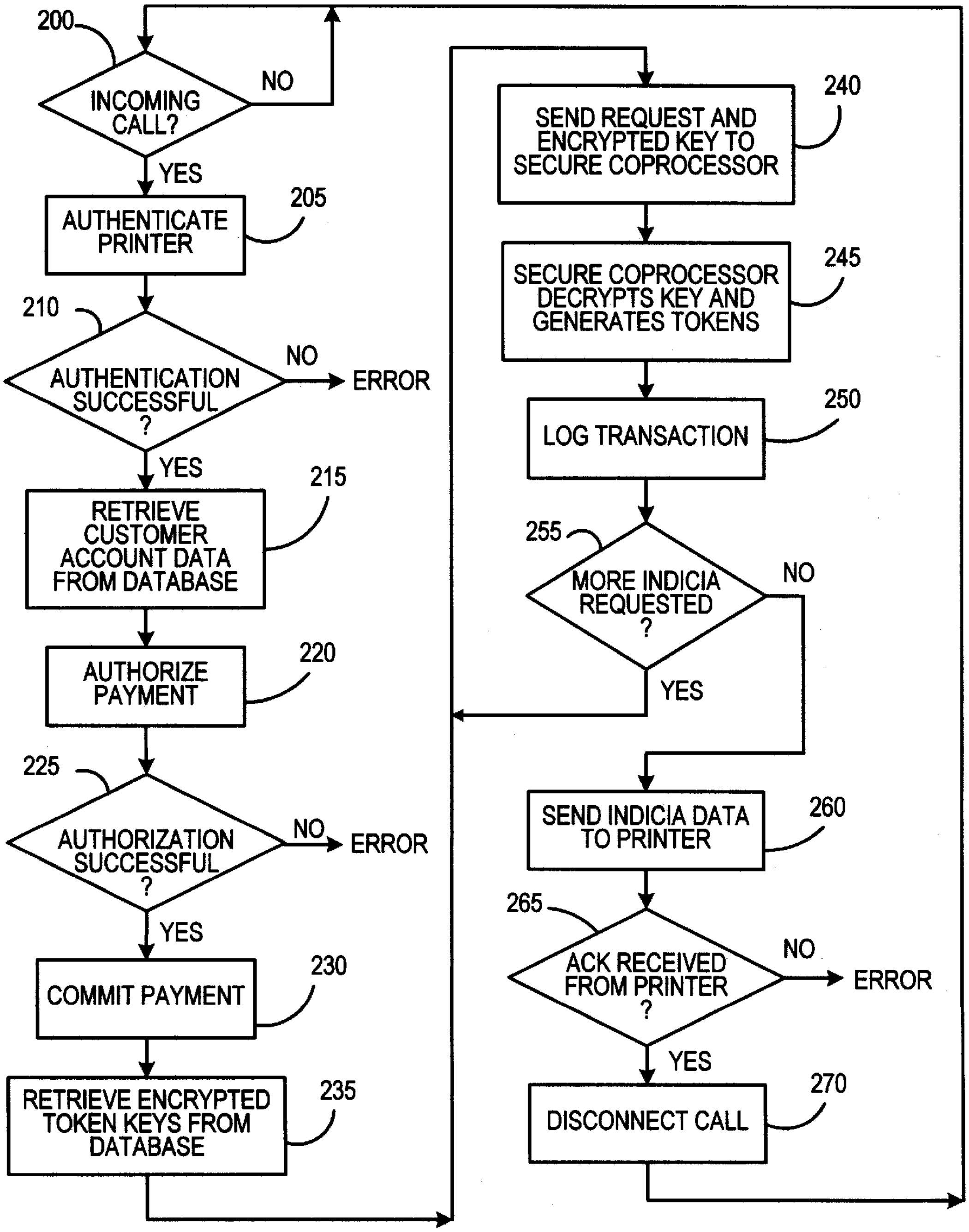
FIG. 3 is a flow chart of the data center operation in the dosed virtual metering system of FIG. 1.

Referring now to FIG. 3, the Data Center 20 operation is described. At step 200, the Data Center 20 monitors incoming calls. When a call is received then, at step 205, the Data Center 20 mutually authenticates with the printer module 30. The printer module 30 identifies itself by its serial number which allows the data center to look up user information and printer specific information, such as printer token keys. Conventional caller ID may also be used as an authentication mechanism. If, at step 210, the authentication is unsuccessful an error is reported. If successful, then, at step 215, user data, such as account balance, available credit line, credit card number (depending on the user's desired payment method) is retrieved from database 22. At step 220, the Data Center 20 begins the process for authorizing payment by the user. The Data Center 20 checks if sufficient funds are available, for example, in the user's account or credit line or if the user is authorized credit card transaction. At step 225, if authorization is unsuccessful an error is reported. If successful, then, at step 230, the Data Center 20 commits payment by debiting the user's account or completing a credit card transaction. At step 235, encrypted keys are retrieved from database 22. In the preferred embodiment, token keys are used to generate digital tokens that are unique to each printer module 30. To enhance security, the token keys are stored encrypted and may only be decrypted by the secure coprocessor 26. At step 240, the Data Center 20 sends the request from printer module 30 and the encrypted key to secure coprocessor 26. At step 245, the secure coprocessor 26 decrypts the encrypted key and uses the decrypted key to generate tokens in response to the request. The use of separate tokens for each indicium allows the Post to verify each mailpiece without a database of all mailpieces. Alternatively, a mailpiece serial number could be issued (as described for FIG. 2) and the Post could check an individual mailpiece against the database for verification purposes. In this case, the mailpiece serial number would probably be digitally signed in order to discourage the printing of random serial numbers by attackers.

At step 250, the Data Center 20 logs the transaction. The logged data could also be sent to the Post in real time to facilitate more extensive verification wherein each mailpiece could be checked against a list of valid mailpieces. At step 255, if more indicia have been requested, the process repeats steps 240 through 250. As previously noted, requests for multiple indicia are sent at the same time to reduce the cost of establishing separate connections to the Data Center for each indicium. If not, then at step 260, the Data Center 20 sends the indicia data to the printer module 30. In the preferred embodiment, the indicia data is for a closed system indicia and includes piece count, postage amount, origin zip, printer identification, date, digital tokens and check digits. Such data allows the Post to verify each indicium using only a limited set of data, i.e., the set of meters token keys. In an alternate embodiment, the indicia data may simply be an indicium serial number (digitally signed or not signed). Since all the indicia that are being issued are known at the Data Center, this information can be sent to the Post, which can then use this data to verify all mailpieces that appear in the mail stream. As previously noted, this alternate method, which may be used for post billing, requires that the Post maintain a database for every mailpiece produced. At step 265, if an acknowledgment is not received from printer module 30 an error is reported. If received, then, at step 270 the call is disconnected.

It will be understood that although the embodiments of the present invention are described as postage metering systems, the present invention is applicable to any value metering system that includes transaction evidencing, such as monetary transactions, item transactions and information transactions. While the present invention has been disclosed and described with reference to a single embodiment thereof, it will be apparent, as noted above, that variations and modifications may be made therein. It is, thus, intended in the following claims to cover each variation and modification that falls within the true spirit and scope of the present invention.

Personal Post Office and PostPerfect are trademarks of Pitney Bowes Inc.

What is claimed is:

1. A method for evidencing postage on a mailpiece comprising the steps of:

transmitting from a printer module to a data center a request for indicia data, including postal value for a selected number of indicia to be printed by the printer module;

verifying at the data center that the printer module is authorized to request the postal value;

retrieving at the data center user account data stored in a database;

authorizing the request for indicia data based on information in the user account data;

accounting at the data center for the postal value for the selected number of indicia;

generating a unique identifier for each of the indicia;

transmitting from the data center-the requested indicia data including postal value and the unique identifier for each of the indicia; and printing the indicia at the printer module.

2. The method of claim 1 wherein the step of authorizing the request includes the steps of:

verifying the user's account data includes sufficient funds for the number of indicia requested; and debiting the user's account data for the total postal value requested.

3. The method of claim 1 wherein the indicia data further includes piece count, origin zip, printer identification, date, and check digits.

4. The method of claim 1, including the further steps of:

logging transaction information relating to each digital token generated and transmitted to the printer module.

5. The method of claim 1, including the further steps of:

selecting at the printer module a number of indicia and the postal value for each of the indicia to be included in the request;

initiating at the printer module communications with the data center; and disconnecting the communications when the requested indicia data has been received by the printer module.

6. The method of claim 1 wherein the unique identifier is a digital token generated at the data center.

7. The method of claim 1 wherein the unique identifier is an indicium serial number generated at the data center.

8. The method of claim 1 wherein the unique identifier is an indium serial number generated at the printer module and sent to the data center as part of the request for indicia data.

9. A postage metering system comprising:

a printer module including a user interface and a processor;

a data center located remotely from the printer module; said data center including a processor, a secure coprocessor and a database, said database including user account information;

means for establishing communication between the printer module and the data center wherein the printer module requests indicia data, including digital tokens, from the data center and the printer prints indicia, including the digital tokens, on mailpieces when the requested indicia data is received from the data center.

10. The system of claim 9 wherein the data center obtains some of the indicia data, including piece count, origin zip and printer identification from the database and generates the digital token at the secure coprocessor.

11. The system of claim 9 wherein the request for indicia data includes a number of indicia and a postal value for each of the indicia.

12. The system of claim 9 wherein the data center verifies the printer module is authorized to request the indicia data.

13. The system of claim 10 wherein the digital token is generated using token keys stored in the database.

14. The system of claim 11 wherein the data center verifies the user's account information includes sufficient funds for the number of indicia requested and debits the user's account information for the total postal value requested.

15. The system of claim 9 wherein the means for establishing communication includes a modem.

16. A transaction evidencing system comprising:

a printer module including a user interface and a processor;

a data center located remotely from the printer module; said data center including a processor and a database, said database including user account information;

means for establishing communication between the printer module and the data center wherein the printer module requests transaction evidencing data, including digital tokens, from the data center and the printer prints the transaction evidence on documents when received from the data center.

* * * * *